(12) United States Patent
Clauson (10) Patent No.: US 7,390,163 B2
(45) Date of Patent: Jun. 24, 2008

(54) RADIAL FLOW TURBINE

(75) Inventor: Luke W. Clauson, 1235 Mills St., Menlo Park, CA (US) 94025

(73) Assignee: Luke W. Clauson, Atherton, CA (US)

( * ) Notice: Subject to any disclaimer, the term of this patent is extended or adjusted under 35 U.S.C. 154(b) by 544 days.

(21) Appl. No.: 11/154,258

(22) Filed: Jun. 15, 2005

(65) Prior Publication Data

US 2006/0283170 A1     Dec. 21, 2006

(51) Int. Cl.
*F02C 7/00*     (2006.01)

(52) U.S. Cl. .............................. 415/83; 415/86; 415/87; 415/199.2; 416/175

(58) Field of Classification Search .................. 415/83, 415/86, 87, 199.2; 416/175
See application file for complete search history.

(56) References Cited

U.S. PATENT DOCUMENTS

| | | | | | |
|---|---|---|---|---|---|
| 746,388 | A | * | 12/1903 | Scheffler | 415/37 |
| 806,177 | A | * | 12/1905 | Oscanyan | 415/199.2 |
| 935,641 | A | * | 10/1909 | Clark | 415/199.2 |
| 2,333,150 | A | * | 11/1943 | Bowen | 415/199.2 |
| 2,945,670 | A | * | 7/1960 | Caddell | 415/175 |
| 4,428,715 | A | * | 1/1984 | Wiggins | 415/199.2 |

\* cited by examiner

*Primary Examiner*—Igor Kershteyn
(74) *Attorney, Agent, or Firm*—Jens E. Hoekendijk (57) ABSTRACT

A multi-stage radial flow compressor and turbine includes a rotor having a first plurality of blades and a second plurality of blades radially outward from the first plurality. A stator has a plurality of blades radially positioned between the two sets of rotor blades. The stator also includes a plurality of combustors positioned radially outward from the stators. The rotor also has turbine blades radially outward from the combustors which are driven by the combusted gas.

23 Claims, 9 Drawing Sheets

RADIAL FLOW TURBINE

BACKGROUND OF THE INVENTION

1. Field of Invention

This invention relates to fluid pumps and motors, specifically for converting energy into or from fluid motion. At least one of these pumps or motors can be combined with other components to create a heat engine such as a gas turbine.

2. Background of the Invention

Many designs have been conceived for pumping fluids. Piston pumps, screw pumps, scroll pumps, centrifugal pumps and axial flow turbines are a few of the common pumps used in industry today. Each has advantages and disadvantages over other designs. For example, single stage devices are often cheaper to manufacture but have limitation on maximum pressure drops across the pump. An example of this is the piston air compressor which is a positive displacement pump. Axial flow turbines are commonly used in large industrial devices such as jet engines. In a jet engine, the compressor is often a multistage axial flow turbine which is followed by another axial flow turbine to extract work from burning gasses. The multistage axial flow turbine represents a high efficiency method of converting energy to and from moving fluids. They are however, extremely expensive to manufacture and have complex flow losses. Some such losses are, flow over the ends of the blades. The design and manufacture of axial flow blades is complex and often expensive due to the three dimensional nature of the blades and stages. Blades generally have a complex, varying cross section across their length and require expensive manufacturing processes. Centrifugal turbines, on the other hand, can be used effectively for high flow applications but suffer efficiency losses due to being configured as single stage devices. Centrifugal turbines often include expensive impellers due to their complex three dimensional nature. There is an efficiency limit for the pressure drop across a blade or stage, often making multistage pumps and motors desirable. This however, increases the cost of manufacture and maintenance.

Since the early 20$^{th}$ century, turbines for extracting power from flowing fluids, such as steam, have been studied and implemented. Several such designs were characterized by turbines with long shafts, on which, disks were mounted (rotor section). On each disk, circular arrays of blades or vanes were mounted. A housing, supported the shaft with its "rotor" plates. The housing also supported circular arrays of stator blades. The fluid would flow in one end of the housing and follow a circuitous path from the inside to the outside of the disks, through the rotor and stator blades. Once the fluid reached the outside of the disk, the housing would route the fluid back toward the center where the flow pattern would repeat until the fluid was expelled out the other end of the housing. This design proved quite expensive and relatively inefficient in part, because of the tortuous path the fluid was required to flow through and large variation in swept area by each stage. There were many frictional losses, including over the blade tips. These designs eventually gave way to efficient axial flow designs.

SUMMARY

In a first aspect of the present, a multi-stage compressor or turbine are provided. The multi-stage compressor or turbine has a housing having a gas inlet and a gas outlet. A rotor is rotatably mounted to the housing and has a first plurality of rotor blades and a second plurality of rotor blades both being positioned radially outward from the gas inlet. A stator is also mounted to the housing and has a first plurality of stator blades positioned radially outward from the first plurality of rotor blades and radially inward from the second plurality of rotor blades. In another aspect of the invention, the stator blades may be closer to the axis of rotation than to a radially outermost portion of the rotor turbine blades.

The rotor blades and the stator blades act as a compression stage for the multi-stage compressor and turbine. A combustion stage is provided by combustors positioned on the stator radially outward from the second plurality of rotor blades. Following combustion, the expanding gas drives a plurality of rotor turbine blades positioned radially outward from the combustors.

The compressor and turbine may also be designed so that gas flows radially inward. When configured in this manner, the rotor blades are positioned radially inward from the gas inlet and the stator blades are positioned radially inward from the rotor blades. The stator's combustors also having a plurality of combustors positioned radially inward from the rotor blades. The rotor also has a plurality of rotor turbine blades positioned radially inward from the plurality of combustors.

The rotor blades may also extend a short distance radially compared to rotor blades on some conventional compressors and turbines. In one aspect, the radially outermost part of the rotor blades extends outward to a radial position no more than one half the radius of the rotor. In another aspect, the rotor blades may have a radial length defined by a radial distance from a radially innermost part to a radially outermost part which is less than one third the radius of the rotor. By sizing the rotor blades in this manner the rotor blades are kept shorter than some conventional compressors and turbines and may provide higher efficiency as compared to conventional compressors and turbines that have relatively long rotor blades when measured radially.

In still another aspect of the present invention, a blade ring is provided which extends between each of the rotor blades and/or between each of the stator blades. The blade rings may be positioned in a recess in the opposing part of the rotor or stator. This blade ring forms a shroud on top of at least one circumferential array of stator or rotor blades.

These and other aspects will become apparent from the following description, drawings and claims.

DETAILED DESCRIPTION—PREFERED EMBODIMENTS

An embodiment of this invention is illustrated in FIGS. 1A-1F, which depict this invention in a simple manifestation: a two stage radial flow compressor. The turbine 10 includes two major components a rotor 12 section and stator 14 section, supported by a compressor housing 15. The rotor 12 section and stator 14 section each have at least one circular pattern of blades 18, or vanes, concentric to each of their axis' of rotation. There exist a first plurality of rotor blades 60 and a second plurality of rotor blades 62. Disposed between these pluralities of rotor blades is a plurality of stator blades 64. Of course, additional pluralities of blades 66 may be provided to act on the gas a required. The blades 18 generally have a two dimensional profile over the majority of their height as opposed to the complex three dimensional profiles in current centrifugal and axial flow turbines. The specific pitch and shape of the blades 18 in each plurality may significantly vary from that for the other pluralities of blades. Stage blade ring(s) 22 may be attached in some configurations to the ends of each set of circular patterns of blades 18. Specifically, in the two stage compressor shown in FIG. 1A, there is an inner rotor blade ring 26, an outer rotor blade ring 28, an inner stator blade ring 30 and an outer stator blade ring 32. These rings are attached by features such as pins 34 that fit in corresponding holes 58 on the stage blade ring(s) 22. Alternately, the stage blade ring(s) 22 can be welded, brazed, glued, swaged or heat-staked into place. The stage blade ring(s) 22 serve to strengthen the individual blades 18 and provide a boundary that encloses the flow traveling by a blade 18. With stage blade rings 22 installed, there is no fluid flow over the tops of individual blades as is common with axial flow turbines. When assembled, in a multistage configuration, the rotor 12 and stator 14 blades form alternating concentric rings. In FIGS. 1A-1E the two stage pump has outer rotor blades 36 and inner rotor blades 38. The pump has corresponding outer stator blades 40 and inner stator blades 42. A concentric array of outer rotor blades 36 and outer stator blades 40 comprise a stage in the pump. A turbine acting as a pump or motor may have many rings, or stages of blades 18 on the rotor 12 and stator 14. The outermost stage may have a large diameter and employ a relatively narrow blade, allowing for each successive stage to have a similar total swept volume to the previous stage. Stage blade widths and angles may be varied to alter the volume swept by each stage with respect to the previous. As the diameter of the turbine 10 gets smaller it becomes increasingly difficult to maintain equal swept volumes between stages as the volume is directly proportional to the square of the stage's inner and outer radii. The direction of fluid flow may go from inner to outer in both the motor and compressor configurations. In certain circumstances the direction of flow may be reversed without significantly deviating from the scope of this invention. Compressor and motor designs will vary in stage number, diameter, blade shape, blade height, blade angle and blade profile based on system requirements, but employ the same general configuration of concentric, two dimensional, generally consistent cross section, stages of blades 18. The arrangement will generally follow the pattern of at least a first plurality of rotor blades 60 and a second plurality of rotor blades 62 with a plurality of stator blades 64 disposed between these pluralities of rotor blades. Features common in the turbine industry such as variable pitch stator blades can be easily adapted to this technology since the blades are particularly easy to actuate given the nature of the blade layout.

The turbine 10 components, such as rotor the 12 and the stator 14 may be manufactured by any casting, molding, machining process or combination thereof. The stator 14 may be manufactured separately and secured to the housing 16 or manufactured as part of a housing by the previously mentioned processes. In all cases the pluralities of blades may be manufactured a part of the rotor 12 or stator 14 or separately manufactured and secured to them later.

The turbine may be operated as a compressor in the manner now described. A power source spins shaft 20 and rotor 12 with respect to stator 14 forcing fluid through the successive stages. Each stage compresses the fluid and forces it into the successive stage until the compressed fluid is expelled from the pump. Compressor housing 15 rotatably supports shaft 20 on bearings 21 which intern supports rotor 12. Housing 15 also funnels fluid or gas into and out of the compressor or turbine.

The turbine may be operated as a motor in the following manner. Fluid is forced into the turbine where it imparts power to each successive stage of rotor blades 18. The power turns rotor 12 and shaft 20 so work can be done by the motor.

It is important to note that these concepts may be used in the design of a compressor or motor. Either may be used with other compressor or motor (turbine) designs in the manufacture of turbine heat engine or they may be used in conjunction with each other, and a combustor, to create a complete gas turbine, and even completely flat gas turbine. In this configuration the combustor section would be disposed between at least one circular array of compressor blades 18 and followed by one circular array of power extracting blades 18.

Figure 4A:
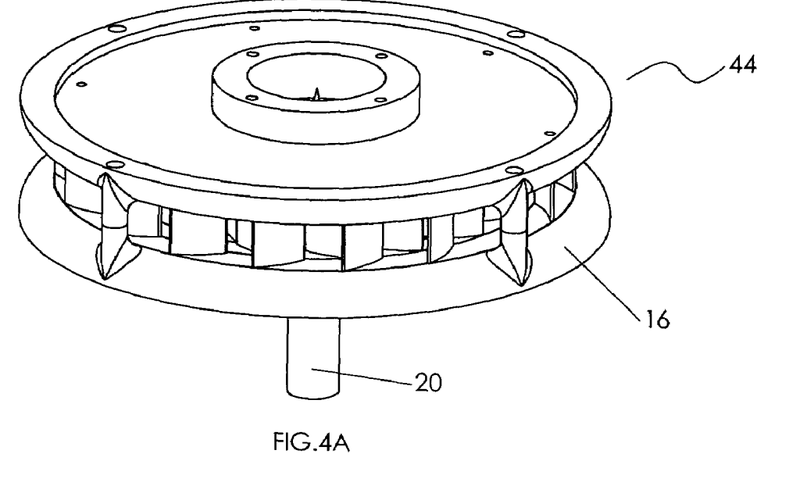
FIG. 4A shows a gas turbine with combustor section concentrically disposed between compressor and turbine sections.
Figure 4B:
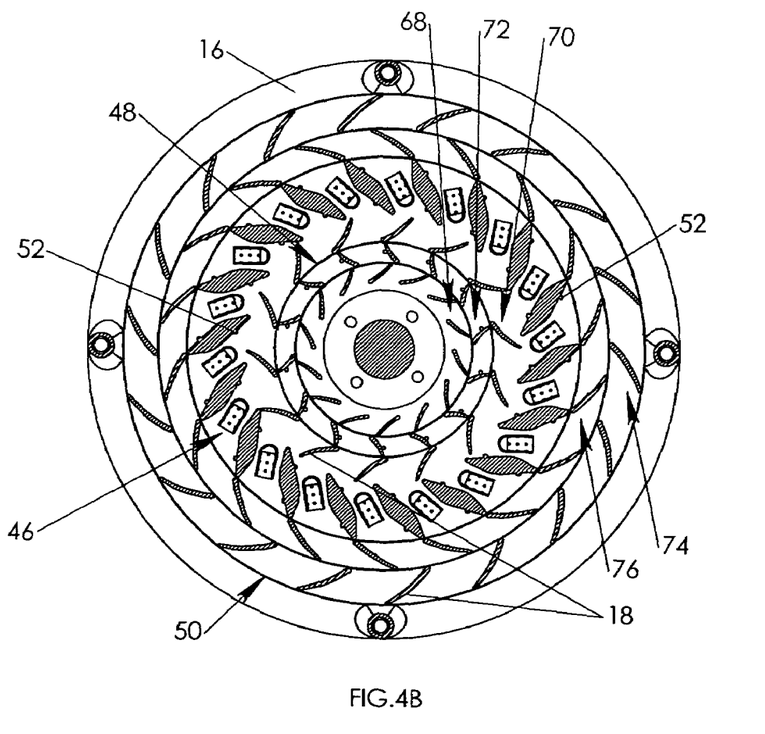
FIG. 4B shows a top section view of the gas turbine from FIG. 4A.
Figure 4C:
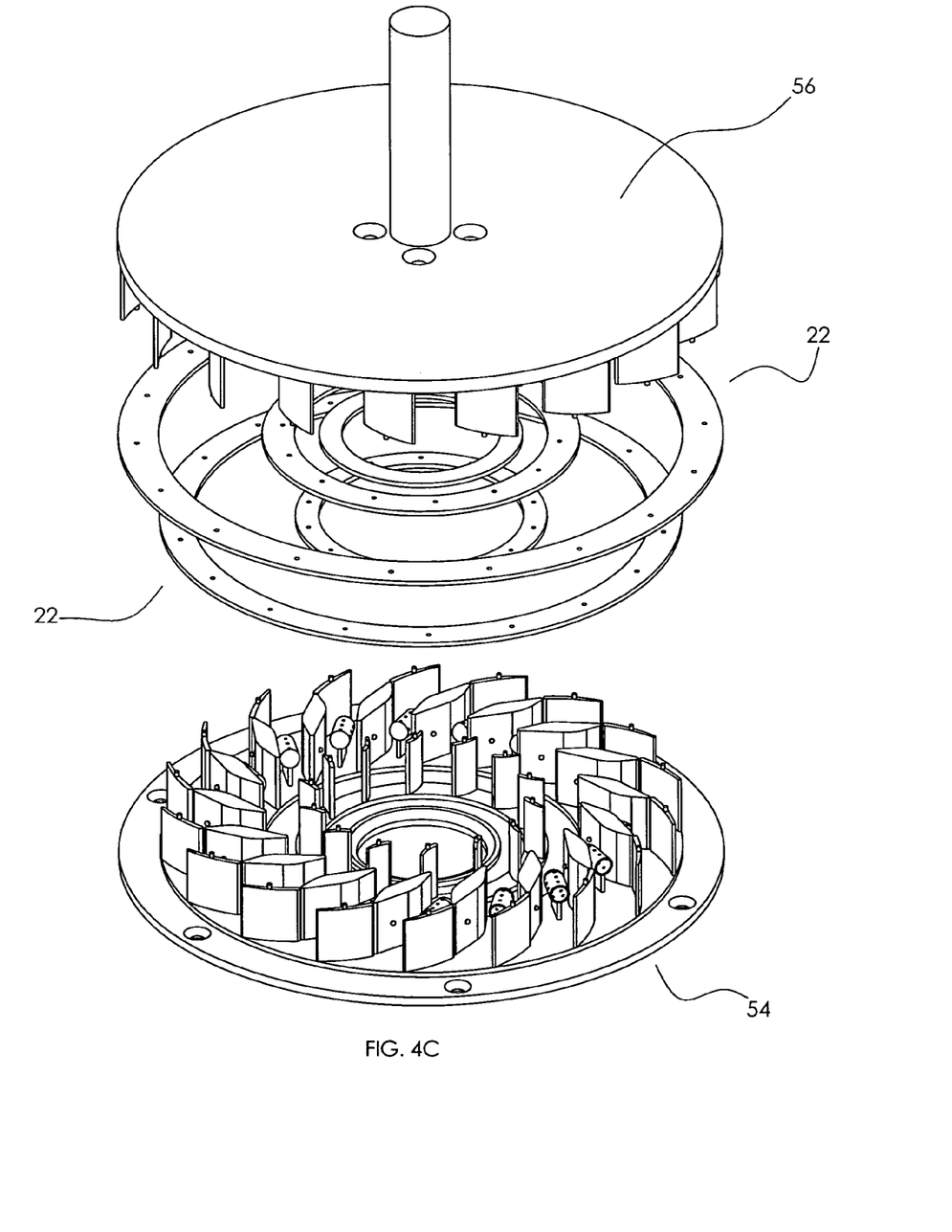
FIG. 4C shows an exploded view of the gas turbine form FIGS. 4A-B (without housing).

FIGS. 4A-C shows a gas turbine 44 with at least one combustor assembly 46 concentrically disposed between compressor section 48 and turbine section 50. In this design at least one pair of rotor-stator rings of blades 18 are provided to serve as a fluid compressor. Specifically, a first plurality of compressor rotor blades 68 and a second plurality of compressor rotor blades 70, both being positioned radially outward from the gas inlet. Disposed between them is a plurality of stator blades 72. This group of pluralities of blades comprises the compressor section 48 of the turbine. Concentric with this compressor section 48 is at least one, or a series, of combustor assemblies 46 for burning fuel and air fed by the compressor section 48. Concentric with the compressor section 48 and circularly arranged series of combustor assemblies 46 is at least one pair or rotor—stator rings of blades 18, creating a turbine section 50 for extracting power from moving fluid. Specifically, the turbine section 50 contains at least one plurality of turbine rotor blades 74 and may contain a plurality of stator turbine blades 76 or nozzles. In some cases, the plurality stator turbine blades 76 closest to the combustor assemblies 46 may be integrated in to the structure that creates the combustor assemblies 46. Additional pairs of pluralities of rotor-stator blades may be added to create a multi-stage turbine section 50. In general operation the compressor section 48 injests and compresses a fluid such as air. This compressed fluid is then combined with a fuel in the combustor assemblies 46 where it is burned, providing a large volume of hot gas to drive a subsequent turbine section 50. A series of fluid injectors 52, which may take the form of nozzles, may be located in the proximity of the combustor assemblies 46 to inject a fluid such as water in the form of a mist. The mist vaporizes, thus increasing the volume of fluid moving through the concentrically oriented turbine section 50. Water has a much higher heat capacity than air, thus providing a good means for reducing the amount of additional cooling air that must be passed through a gas turbine in excess of the air required for compete combustion of the fuel in the combustors. The addition of water to be vaporized in the proximity of the combustors also allows the combustion process to run hotter and potentially more efficiently while keeping the exhaust gas-steam mixture running through the turbine section 50 within an acceptable operating temperature. Introducing water into the system here combines a common, high efficiency power production method, which includes a gas turbine driving a generator and a steam turbine driving a generator. The steam is generated using the heat from the gas turbine exhaust after it exits the turbine section of the gas turbine, capturing the additional heat unconverted to rotational energy in the gas turbine. Injection of water mist in the proximity of the combustor allows the advantages and efficiency of such a combined cycle system to be realized in a much smaller and cost effective package. The whole assembly is supported by a housing 16 that rotatably supports a stator/combustor assembly 54 and a combined rotor assembly 56, each supporting blades 18 for the compressor section 48 and turbine section 50. The housing 16 rotatably supports the combined rotor assembly 56 on shaft 20. Stage blade ring(s) 22 may be included as previously discussed in the form or rotor blade rings and stator blade rings. In all cases, the pluralities of stator blades can be actuated to provide variable pitch function across different operating parameters.

Figure 3A:
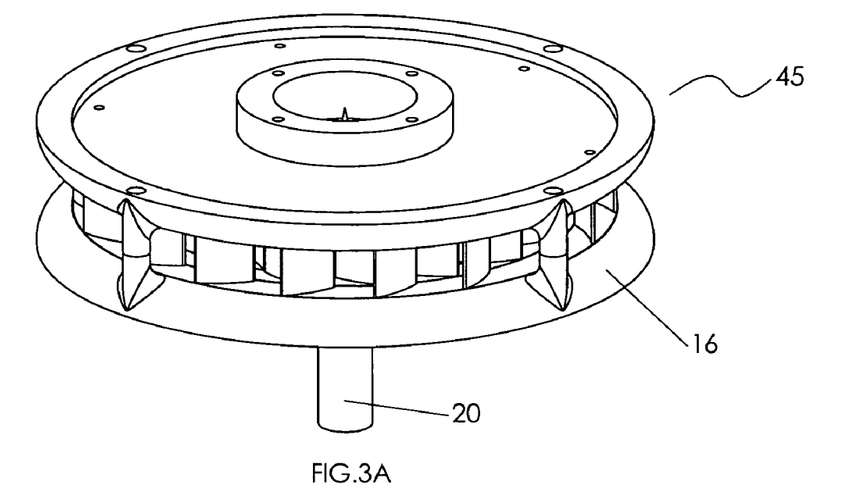
FIG. 3A shows a gas turbine with combustor section concentrically disposed between compressor and turbine sections.
Figure 3B:
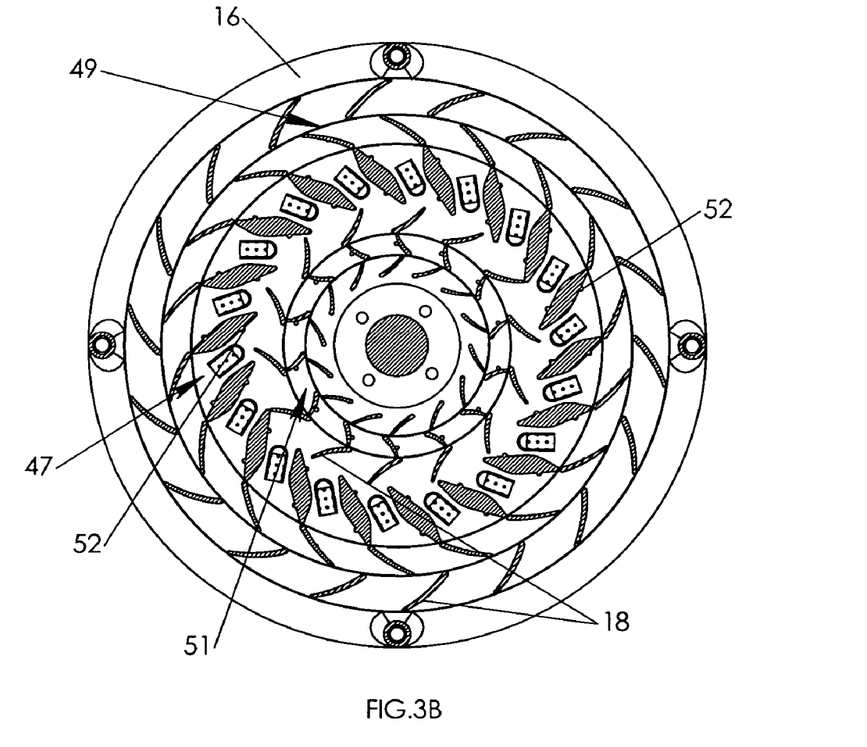
FIG. 3B shows a top section view of the gas turbine from FIG. 3A.
Figure 3C:
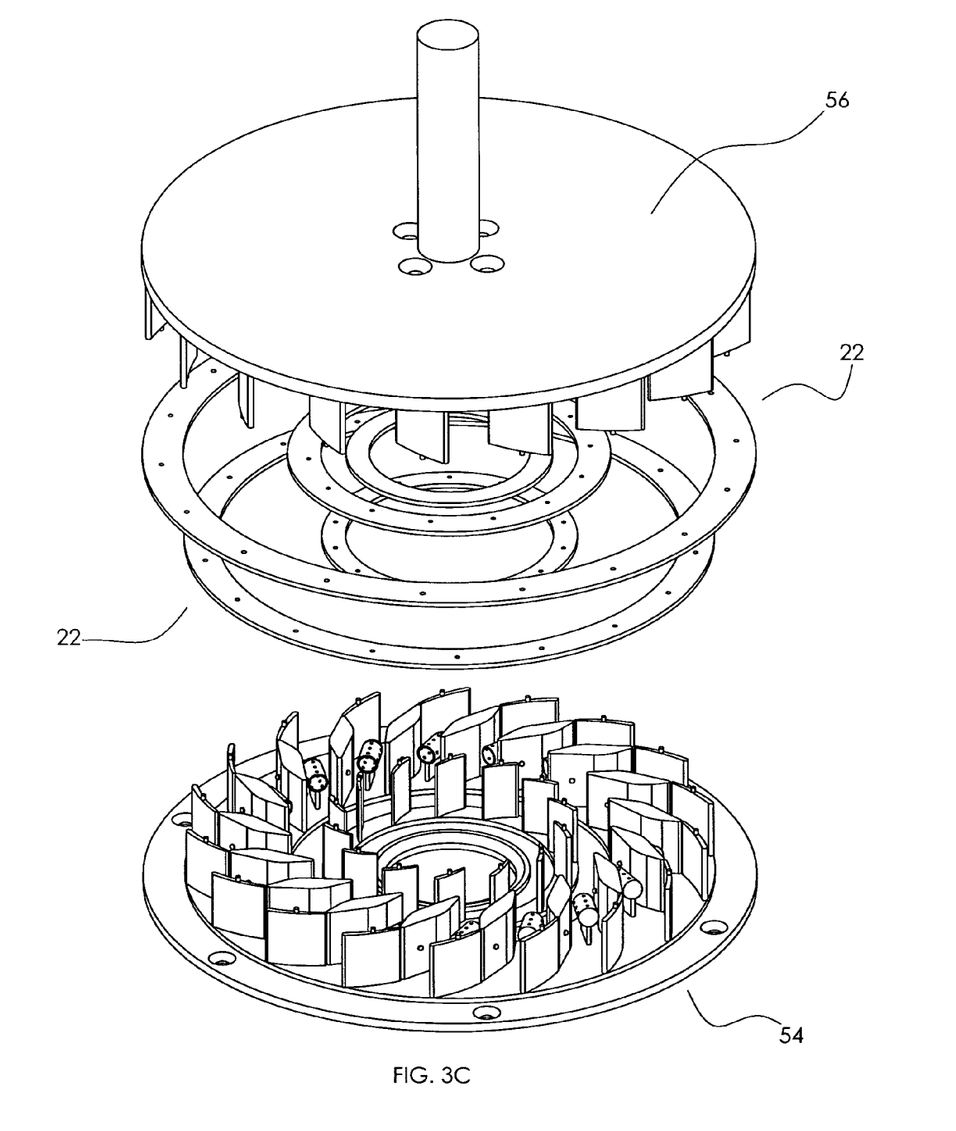
FIG. 3C shows an exploded view of the gas turbine form FIGS. 3A-B (without housing).

FIGS. 3A-C shows a gas turbine 45 with at least one combustor assembly 47 concentrically disposed between compressor section 49 and turbine section 51. However, in this case, the gas inlet is radially outside of the gas outlet. This configuration of the gas turbine can be understood by the previous discussion of FIGS. 4A-C and does not significantly depart from the scope of the invention.

Figure 1A:
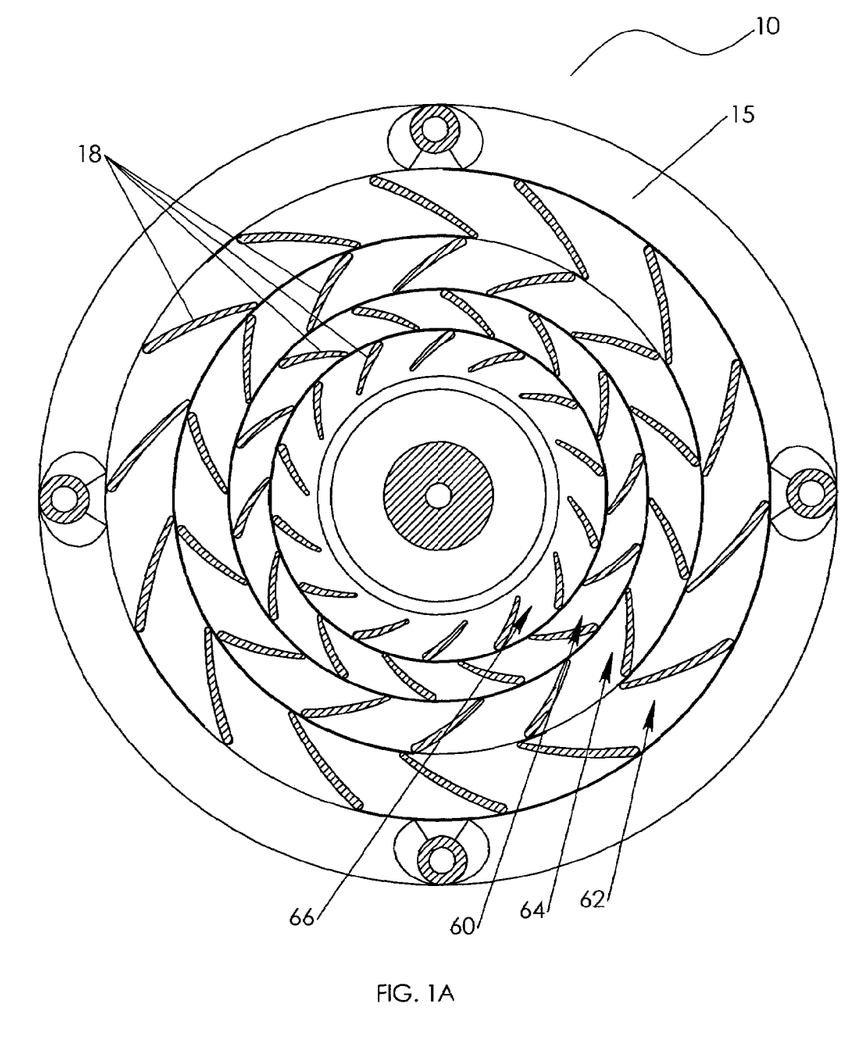
FIG. 1A shows a top section view of a two stage fluid compressor.
Figure 1B:
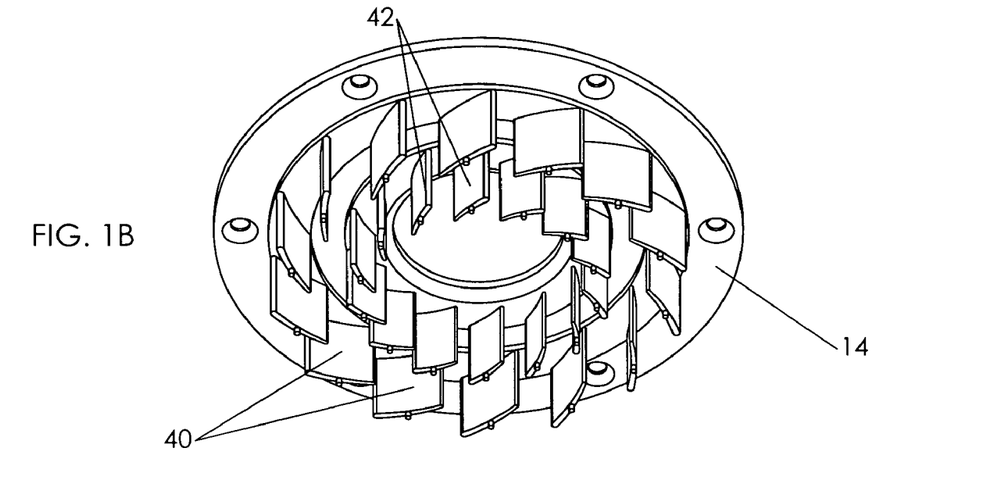
FIG. 1B shows the stator of the compressor of FIG. 1A.
Figure 1C:
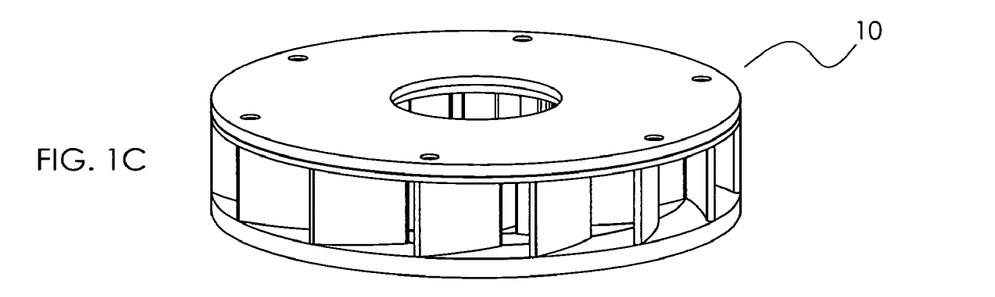
FIG. 1C shows an isometric perspective of the assembled multiple stage turbine compressor rotor of FIG. 1D and stator of FIG. 1B.
Figure 1D:
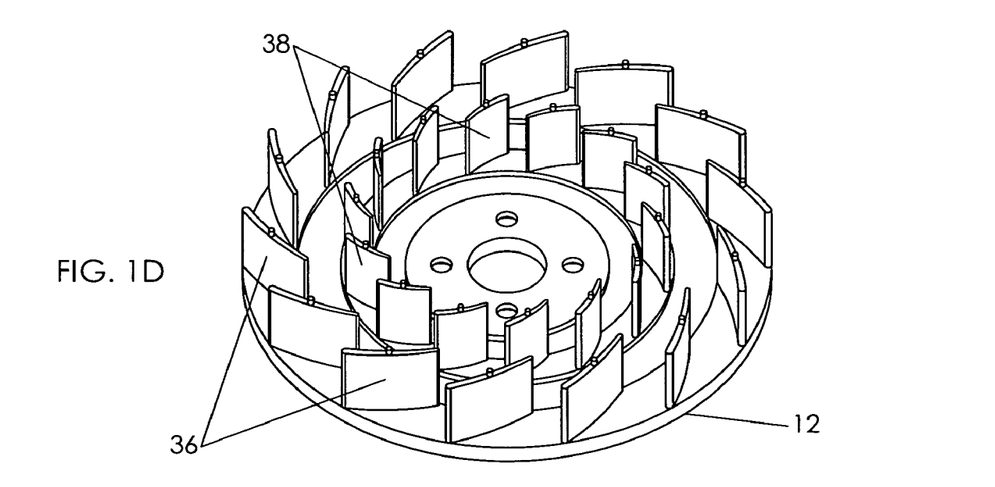
FIG. 1D shows the rotor of the compressor of FIG. 1A and FIG. 1C.
Figure 1E:
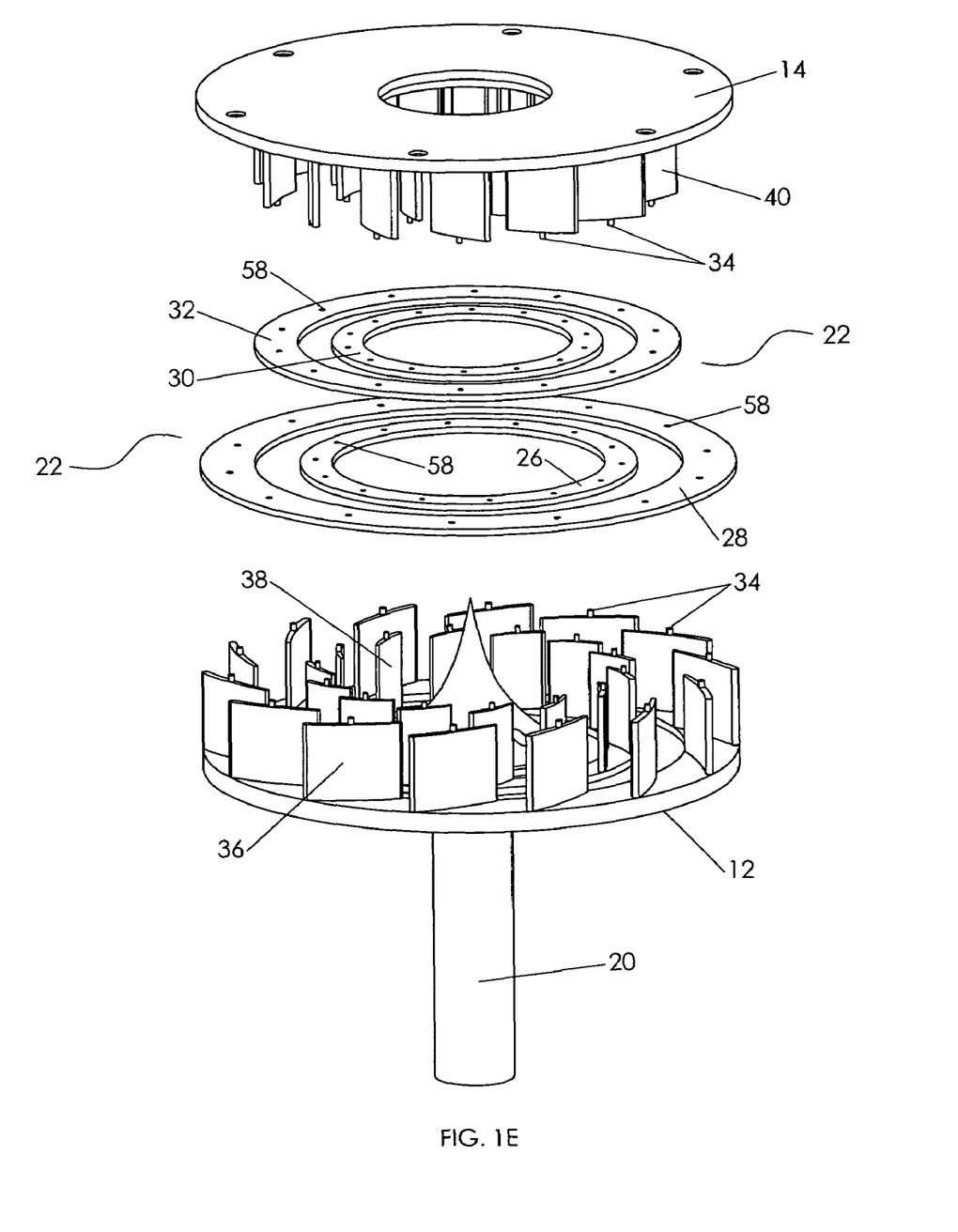
FIG. 1E shows section view of an assembled two stage turbine.
Figure 1F:
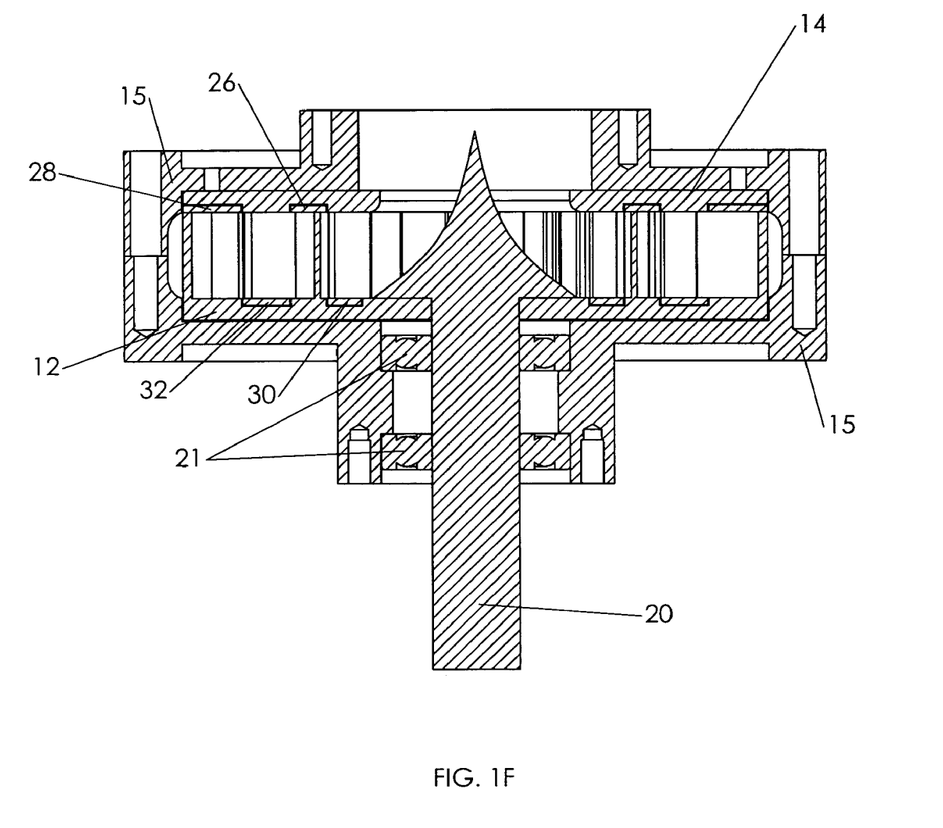
FIG. 1F shows a section view of the compressor of FIGS. 1A-E.
Figure 2A:
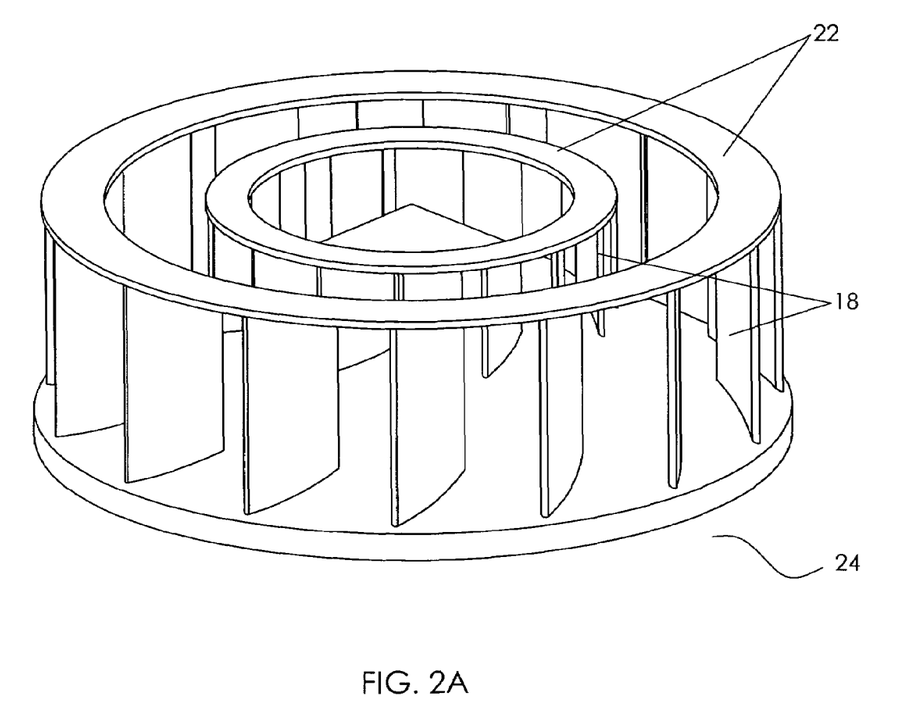
FIG. 2A show a conically shaped rotor.

FIG. 2A shows another embodiment of the present invention, a cone shaped rotor 24. The principal difference between this and the previous embodiment is that one or both of the rotor 12 or stator 14 may be cone shaped. The blades would still utilize a consistent cross section blade that utilize a single profile over its vertical height. An appropriately shaped stage blade ring 22 may be used in this configuration as well. Even with this design there is still the distinct advantage that the rotor 12 and stator 14 can be machined or otherwise manufactured without complex blade 18 shapes. A machining process would principally require only three axis machining rather than at least four as commonly used for other rotor and stator designs. It can be molded as well, which is very difficult with non-consistent cross section blades or blades that are curved over their height. Finally, the cone may be a right cone, as shown, or defined by a parabola or other function. Both the rotor and stator may have a cone shaped base or one may employ a cone shape while the other employs a flat profile. Obviously, the tops of the blades of each mating component, whether rotor or stator would have to match its pair's profile such that they mate.

Finally, the blades 18 of the stator 12 section, or blades of the stator/combustor assembly 54 may be adjusted by means commonly employed on current axial flow turbines to optimize flow characteristics during different operating parameters. This is known as a variable pitch stator. The circular arrays of blades 18 in the rotor component of a pump or turbine may be manifested as multiple rotors, each including one or more circular array of blades 18. The housing 16 would concentrically, rotatably support each and make provision for mechanical linking of multiple rotors. Each rotor, with its associated circular array of blades could spin at some speed with respect to the other rotors employed in the system.

The rotor 12 blades 18 of the present invention may be relatively short when measured in a radial direction and compared to the radius of the rotor 12. In one aspect, the rotor blades 18 have a radially outermost part which extends radially outward no more than half the radius of the rotor 12 with the rotor 12 radius being defined by a radial distance from the axis of rotation to a radially outermost part of the rotor turbine blades 18. Stated another way, the rotor blades 18 may have a radial length defined by a radial distance from a radially innermost part to a radially outermost part which is less than one third the radius of the rotor 12. The stator 14 blades 18 may also be somewhat limited in their radial dimension in that the stator blades may be closer to the axis of rotation than to a radially outermost portion of the rotor 12 blades 18.

The present invention has been described with respect to various preferred embodiments, however, it is understood that numerous other configurations may be provided within the scope of the present invention.

The invention claimed is:

1. A multi-stage compressor and turbine, comprising:
   a housing;
   a gas inlet coupled to the housing;
   a gas outlet coupled to the housing;
   a rotor having a first plurality of rotor blades and a second plurality of rotor blades both being positioned radially outward from the gas inlet, the rotor being rotatable about an axis of rotation relative to the housing, the axis of rotation defining radial directions perpendicular to the axis of rotation;
   a stator having a first plurality of stator blades positioned radially outward from the first plurality of rotor blades and radially inward from the second plurality of rotor blades, the stator also having a plurality of combustors positioned radially outward from the second plurality of rotor blades;
   the rotor also having a plurality of rotor turbine blades positioned radially outward from the plurality of combustors.

2. The multi-stage compressor of claim 1, wherein:
   the stator has a second plurality of stator blades positioned radially outward from the second plurality of rotor blades, the plurality of combustors being positioned radially outward from the second plurality of stator blades.

3. The multi-stage compressor of claim 1, wherein:
   the stator has a plurality of stator turbine blades positioned radially outward from the plurality of rotor turbine blades.

4. The multi-stage compressor of claim 1, wherein:
   the stator has a plurality of fluid injection ports positioned radially inward of the plurality of rotor turbine blades and radially outward from the first plurality of stator blades.

5. The multi-stage compressor of claim 1, wherein:
   the plurality of fluid injection ports are configured to inject water.

6. The multi-stage compressor of claim 1, further comprising:
   a rotor blade ring attached to each of the first plurality of rotor blades, the rotor blade ring being positioned in a recess in the stator.

7. The multi-stage compressor of claim 6, further comprising:
a stator blade ring attached to each of the first plurality of stator blades, the stator blade ring being positioned within a recess in the rotor.

8. A compressor and turbine, comprising:
a housing;
a gas inlet coupled to the housing;
a gas outlet coupled to the housing;
a rotor having a first plurality of rotor blades positioned radially outward from the gas inlet, the rotor being rotatable about an axis of rotation relative to the housing, the axis of rotation defining radial directions which are perpendicular to the axis of rotation; and
a stator having a first plurality of stator blades positioned radially outward from the first plurality of rotor blades, the stator also having a plurality of combustors positioned radially outward from the first plurality of rotor blades;
the rotor also having a plurality of rotor turbine blades positioned radially outward from the plurality of combustors, the rotor having a radius defined by a radial distance from the axis of rotation to a radially outermost part of the rotor turbine blades, the first plurality of rotor blades having a radially outermost part which extends radially outward to a position no more than one half the radius of the rotor.

9. The compressor and turbine of claim 8, wherein:
the rotor includes a second plurality of rotor blades positioned radially outward from the first plurality of stator blades.

10. The compressor and turbine of claim 9, wherein:
the stator includes has a second plurality of stator blades positioned radially outward from the second plurality of rotor blades, the plurality of combustors being positioned radially outward from the second plurality of stator blades.

11. The compressor and turbine of claim 9, wherein:
the stator has a plurality of stator turbine blades positioned radially outward from the plurality of rotor turbine blades.

12. The compressor and turbine of claim 9, wherein:
the stator has plurality of fluid injection ports positioned radially inward of the plurality of rotor turbine blades and radially outward from the first plurality of stator blades.

13. The compressor and turbine of claim 11, wherein:
the plurality of fluid injection ports are configured to inject water adjacent to the plurality of combustors.

14. The compressor and turbine of claim 11, further comprising:
a rotor blade ring attached to each of the first plurality of rotor blades.

15. The compressor and turbine of claim 11, further comprising:
a stator blade ring attached to each of the first plurality of stator blades, the stator blade ring being recessed relative to the rotor.

16. A compressor and turbine, comprising:
a housing;
a gas inlet coupled to the housing;
a gas outlet coupled to the housing;
a rotor having a first plurality of rotor blades positioned radially outward from the gas inlet, the rotor being rotatable about an axis of rotation relative to the housing, the axis or rotation defining radial directions perpendicular to the axis of rotation; and
a stator having a first plurality of stator blades positioned radially outward from the first plurality of rotor blades, the stator also having a plurality of combustors positioned radially outward from the second plurality of rotor blades;
the rotor also having a plurality of rotor turbine blades positioned radially outward from the plurality of combustors, the rotor having a radius defined by a distance from the axis of rotation to a radially outermost part of the rotor turbine blades, the first plurality of rotor blades having a radial length defined by a radial distance from a radially innermost part to a radially outermost part which is less than one third the radius of the rotor.

17. The compressor and turbine of claim 16, wherein:
the rotor includes a second plurality of rotor blades, the first plurality of stator blades being radially inward from the second plurality of rotor blades.

18. The compressor and turbine of claim 16, wherein:
the stator has a second plurality of stator blades positioned radially outward from the second plurality of rotor blades, the plurality of combustors being positioned radially outward from the second plurality of stator blades.

19. The compressor and turbine of claim 16, wherein:
the stator has a plurality of stator turbine blades positioned radially outward from the plurality of rotor turbine blades.

20. The compressor and turbine of claim 16, wherein:
the stator has plurality of fluid injection ports positioned radially inward of the plurality of rotor turbine blades and radially outward from the first plurality of stator blades.

21. The compressor and turbine of claim 16, wherein:
the plurality of fluid injection ports are configured to inject water adjacent to the plurality of combustors.

22. The compressor and turbine of claim 16, further comprising:
a rotor blade ring attached to each of the first plurality of rotor blades.

23. The compressor and turbine of claim 16, further comprising:
a stator blade ring attached to each of the first plurality of stator blades, the stator blade ring being recessed relative to the rotor.

* * * * *